United States Patent
Dugar et al.

(10) Patent No.: US 10,657,154 B1
(45) Date of Patent: May 19, 2020

(54) PROVIDING ACCESS TO DATA WITHIN A MIGRATING DATA PARTITION

(71) Applicant: Amazon Technologies, Inc., Seattle, WA (US)

(72) Inventors: Rajib Dugar, Bellevue, WA (US); Qu Chen, Seattle, WA (US); Suraj Narkhede, Vancouver (CA); Aseem Cheema, Mercer Island, WA (US); Kevin Robert McGehee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 15/666,501

(22) Filed: Aug. 1, 2017

(51) Int. Cl.
*G06F 17/00* (2019.01)
*G06F 16/27* (2019.01)
*G06F 9/50* (2006.01)
*G06F 16/21* (2019.01)

(52) U.S. Cl.
CPC .......... *G06F 16/278* (2019.01); *G06F 9/5061* (2013.01); *G06F 16/214* (2019.01); *G06F 16/211* (2019.01)

(58) Field of Classification Search
CPC ..... G06F 16/278; G06F 16/214; G06F 9/5061
USPC .................................................. 707/600–899
See application file for complete search history.

(56) References Cited

U.S. PATENT DOCUMENTS

| | | |
|---|---|---|
| 7,389,393 B1 | 6/2008 | Karr et al. |
| 7,669,032 B2 | 2/2010 | Karr et al. |
| 8,069,218 B1 | 11/2011 | Tormasov et al. |
| 2006/0288048 A1 * | 12/2006 | Kamohara ............ G06F 16/119 |
| 2012/0254175 A1 | 10/2012 | Horowitz et al. |
| 2014/0108339 A1 | 4/2014 | Marsden |

OTHER PUBLICATIONS

Parker Selbert, "Migrating Redis Data," Sep. 15, 2015, downloaded from http://sorentwo.com/2015/09/15/migrating-redis-data.html, pp. 1-5.

* cited by examiner

*Primary Examiner* — Isaac M Woo
(74) *Attorney, Agent, or Firm* — Robert C. Kowert; Kowert, Hood, Munyon, Rankin & Goetzel, P.C.

(57) ABSTRACT

Data within a database partition that is being migrated may be made available for access. Data within a database partition may be selected for migration. Writes to the selected data may be prevented while the data is being migrated. Writes to other data, or read access any of the partition, may be allowed during the migration of the selected data. Rollback events may be detected for a database partition that is being migrated, halting the further selection of data for migration and deleting the successfully migrated data at the copy of the database partition being created.

20 Claims, 9 Drawing Sheets

PROVIDING ACCESS TO DATA WITHIN A MIGRATING DATA PARTITION

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. Distributed storage can also provide the opportunity to change the configuration or partitioning of data, such as by increasing, decreasing, or otherwise changing the location of data by migrating partitions of data from one location to another. Migrating partitioned data, however, can impede the performance of distributed systems by blocking or delaying access to partitions of data that are migrated. Techniques that can provide migration techniques that minimize or eliminate the impact upon the ability of users to access data are, therefore, highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement logical block diagram providing access to data within a migrating data partition, according to some embodiments. Data may be distributed across one or more locations in a storage system in different partitions, in some embodiments. In this way, clients can access and independently update different partitions of the data set at the one or more locations in the storage system, in some embodiments. For example, partitions may be identified and created according to schemes that distribute the data amongst partitions evenly, such as hash-based partitioning schemes. The partitions can then be evenly assigned or allocated to different locations within the distributed system so that the processing responsibility may be evenly distributed, in one embodiment.

Distributed systems often operate in dynamic environments where the workload, size of the data being stored, or performance of components within the distributed system can change. In order to adapt the distributed system to changing conditions, migration operations to move partitions from one location, such as a source node currently hosting the partition, to another location, a target node to host the partition, may be performed, in some embodiments. Techniques that provide access to data of a partition while the partition is being migrated can reduce or eliminate the delay that may be experienced by users or other clients that access the partition as part of accessing the data set in the distributed system.

Figure 1:
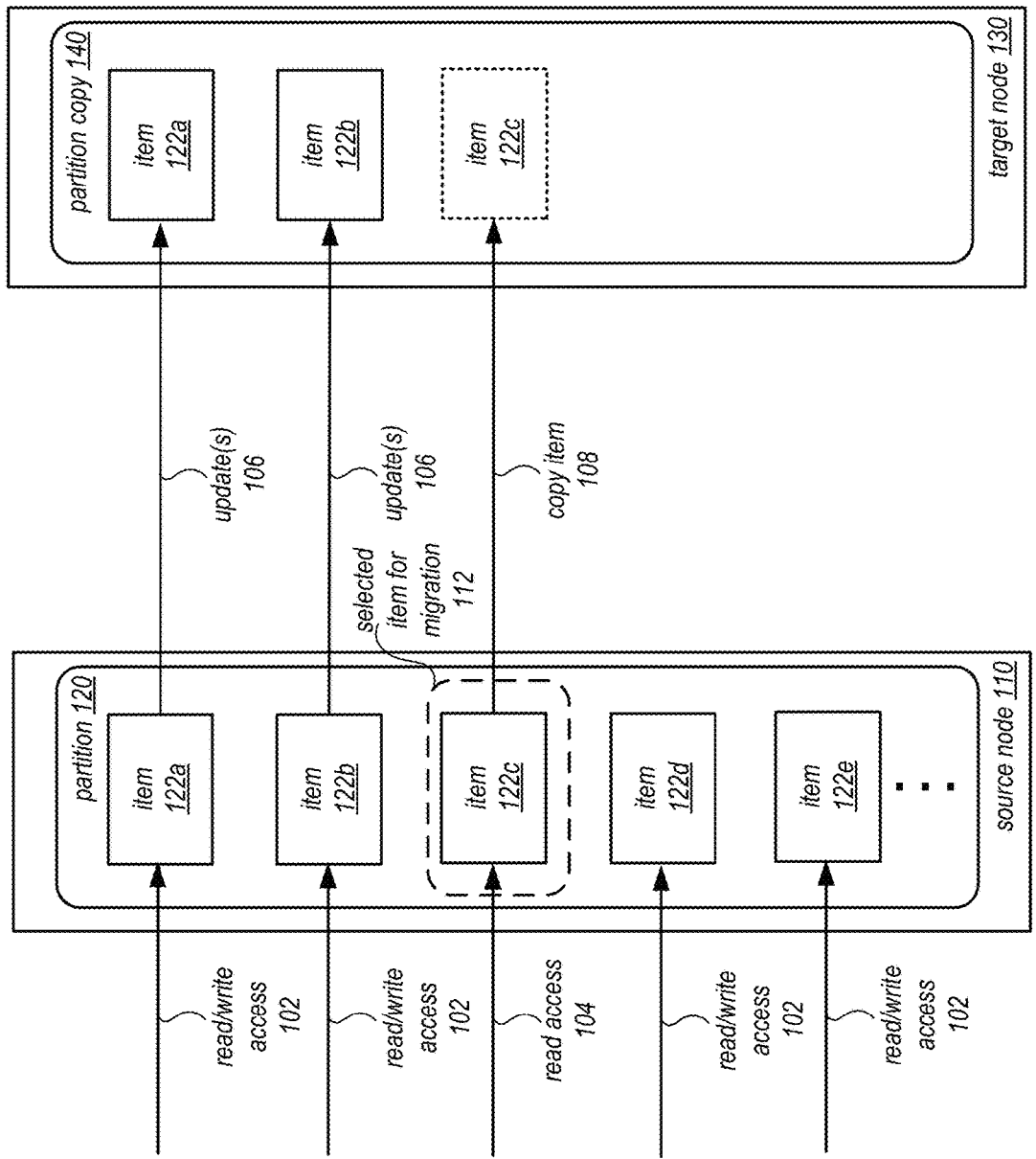
FIG. 1 is a logical block diagram providing access to data within a migrating data partition, according to some embodiments.

FIG. 1 is a logical block diagram providing access to data within a migrating data partition, according to some embodiments. A data set, such as a database, may be divided into different partitions according to a partitioning schema (e.g., based item key, item, or other values of objects within the data set). The data set may be one or more data structures, objects or other groupings of data distributed amongst multiple locations for storage and access, in some embodiments. For example, as illustrated in FIG. 1, source node 110 may store a partition 120 of a data set, in one embodiment. In at least some embodiments, partition 120 may be separately replicated amongst multiple nodes (not illustrated) in order to increase the durability and availability of partition 120. For example, source node 110 may be one of multiple nodes storing copies of partition 120, in some embodiments. However, in at least some embodiments, one of the multiple nodes (e.g., source node 110) may be responsible for providing access to partition 120 (e.g., by accessing partition 120 for read requests and sending updates to other nodes for separate replication).

Nodes, such as nodes source node 110 and target node 130 may be one or more virtual or physical storage devices, processing devices, servers or other computing systems, such as computing system 1000 discussed below with regard to FIG. 9 that may store data for a database, including partition 120 and partition copy 140, in various embodiments. Nodes may provide access to data within a partition, such as items 122a, 122b, 122c, 122d, 122d, and so on.

A migration operation may be initiated for partition 120, in some embodiments, to transfer the responsibility of providing access to partition 120 to another node, such as target node 130. Migration events, as discussed below with regard to FIGS. 5 and 6, may trigger the migration operation in order to increase a number of nodes in cluster of nodes hosting the data set, decrease the number of nodes hosting the data set, or replace a node, source node 110, in the cluster of nodes hosting the data set. Source node 110 may copy the items 122 of partition 120 to a partition copy 140 at target node 130. In some embodiments, source node may iteratively and/or serially select and copy the items to target node 130. For example, as illustrated in FIG. 1, source node 110 may have previously selected and copied items 122a and 122b to target node 130. Source node 110 may have currently selected and be performing the migration of item 122c, by sending the item 108 to be copied as part of partition copy 140, in one embodiment.

In at least some embodiments, partition 120 may still be available for read and write access 102 at those items not currently being migrated. For example, for writes to items already migrated, such as items 122a or 122b, source node 110 may perform the update and then replicate the update(s) 106 to the respective items in the target node 130 as part of the migration operation, in one embodiment. As for those items not yet migrated, such as items 122d or 122e, writes may be applied to the item in place in partition 120. While writes may be enabled for items not currently being migrated, writes may be prevented for item 122c which is being migrated. For example, an update queue, lock table, or other migration state information may be maintained that indicates which items are being migrated. If an access request for a currently migrating item is received, the update may be delayed or denied until the item is migrated, as discussed below with regard to FIGS. 5-7, in some embodiments. Once migration of the partition is completed to partition copy 140, then target node 130 may assume responsibility for the partition so that subsequent requests are redirected to target node 130, in some embodiments. Because updates(s) 106 are replicated to target node 130, partition copy 140 may be consistent with partition 120 at the time responsibility is switched over to target node 130, in some embodiments.

Please note that previous descriptions of implementing providing access to data within a migrating data partition are not intended to be limiting, but are merely provided as logical examples. The number of items selected for migration may be different, for example.

This specification begins with a general description of a provider network that may implement a database service. The database service may implement providing access to data within a migrating data partition, in one embodiment. Then various examples of a database service are discussed, including different components/modules, or arrangements of components/module, that may be employed as part of implementing the database service, in one embodiment. A number of different methods and techniques to implement providing access to data within a migrating data partition are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
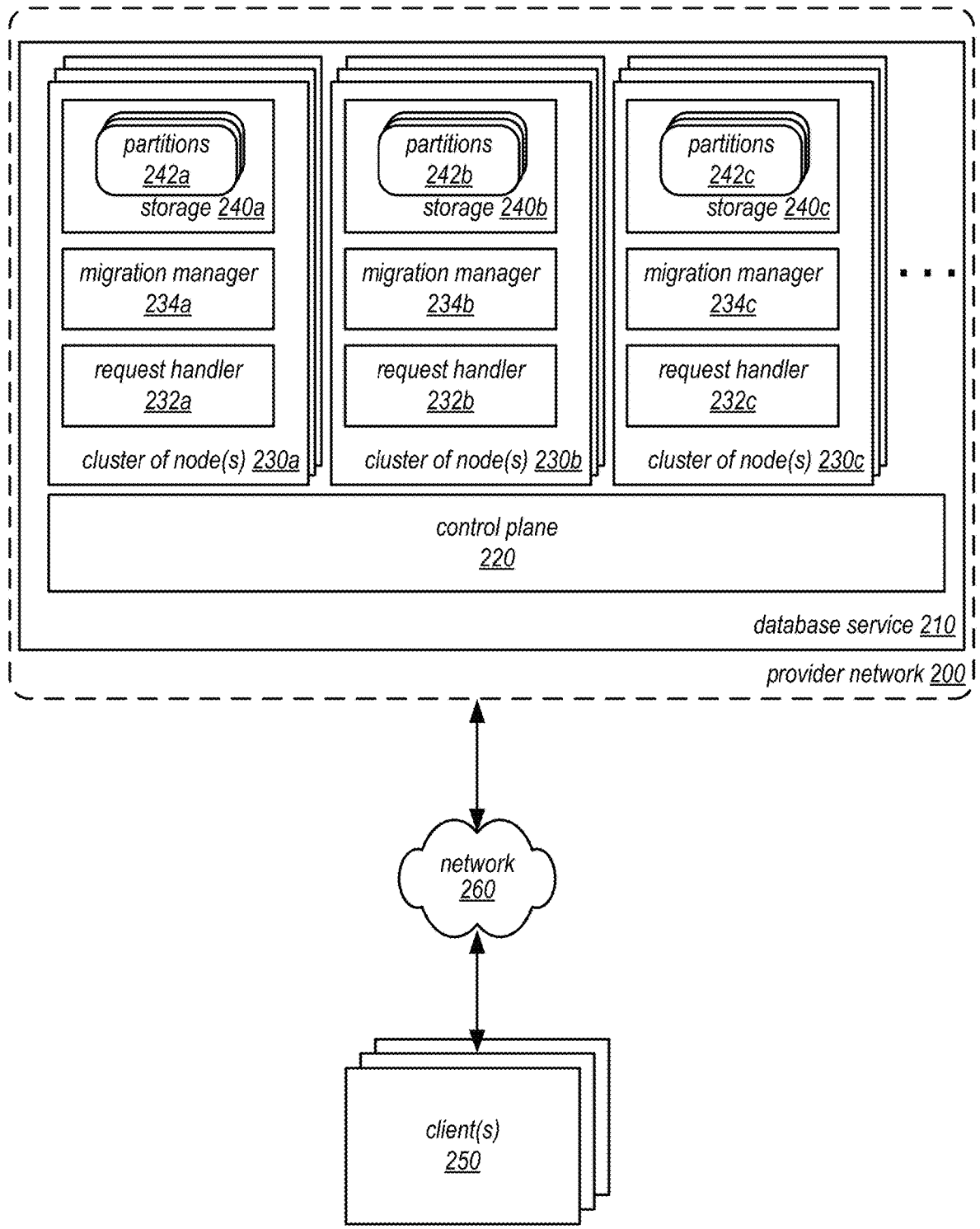
FIG. 2 is a logical block diagram illustrating a provider network that implements a database service, according to some embodiments.

FIG. 2 is a logical block diagram illustrating a provider network that implements a database service, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In one embodiment, provider network 200 may implement various computing resources or services, such as database service(s) 210 (e.g., relational or non-relational (NoSQL) database query engines), or other data processing services as part of other services, such as map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 9 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of processing nodes that implement map reduce functionality over data stored in another service in provider network 200. Various other distributed processing architectures and techniques may be implemented by database service(s) 210 (e.g., grid computing, sharding, distributed hashing, etc.) in another embodiment. In at least some embodiments, database service 210 may implement an in-memory database, which may utilize a non-relational or key-value based structure for managing data, such as Redis.

In one embodiment, clients 250 may encompass any type of client configurable to submit network-based requests to provider network 200 via network 260, including requests for database service(s) 210 (e.g., to perform a consistent query at a secondary index for a database hosted in database service 210) or data storage service(s) (e.g., a request to create, read, write, obtain, or modify data in data storage service(s), etc.). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications.

In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture.

In one embodiment, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network 200. It is noted that in one embodiment, client(s) 250 may communicate with provider network 200 using a private network rather than the public Internet.

Database service 210 may control plane 220, in one embodiment. Control plane 220 may receive, authenticate, parse, throttle, and/or dispatch service or other access requests, among other things, in one embodiment. In one embodiment, database service 210 may implement control plane 220 to implement one or more administrative components, which may provide a variety of visibility and/or control functions. In one embodiment, database service 210 may also implement a plurality of nodes, which may implement a database in distributed fashion as a cluster of nodes 230. A database may be divided into multiple partitions, which may be distributed amongst the nodes of a cluster 230. Each node may manage one or more partitions 242 of the database on behalf of clients/users.

Control plane 220 may provide visibility and control to system administrators, detect migration events or roll-back events for migration, as discussed below with regard to FIGS. 5-8, and/or anomaly control, resource allocation, in one embodiment. In one embodiment, control plane 220 may also include an admin console, through which system administrators may interact with database service 210 (and/or the underlying system). In one embodiment, the admin console may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at database service 210, in one embodiment.

Control plane 220 may direct the performance of different types of control plane operations among the nodes, systems, or devices implementing database service 210, in one embodiment. For instance, control plane 220 may communicate with nodes to initiate the performance of various control plane operations, such as migrations, update tables, delete tables, create indexes, etc. . . . In one embodiment, control plane 220 may update a task registry (or some other table or data structure) with the status, state, or performance information of the control plane operations currently being performed. Control plane 220 may detect, direct, or otherwise instigate different partition migration operations to add, remove, or modify the membership of nodes in a cluster.

Control plane 220 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, control plane 220 may perform parsing and/or throttling of service requests, authentication and/or metering of service requests, dispatching service requests, and/or maintaining a partition assignments that map processing nodes to partitions.

Clusters of nodes, such as clusters of nodes 230a, 230b, and 230c, may implement respective request handlers, such as request handlers 232a, 232b, and 232c I some embodiments. Request handler 232 may implement database management, in one embodiment. Request handler 232 may create, update, define, query, and/or otherwise administer databases, in one embodiment. For instance, request handler 232 may maintain a database according to a database model (e.g., a relational or non-relational database model). In one embodiment, request handler 232 may allow a client to manage data definitions (e.g., Data Definition Language (DDL) requests to describe column definitions, requests to add item attributes, etc.). In one embodiment, request handler 232 may handle requests to access the data (e.g., to insert, modify, add, or delete data as well as requests to query for data by generating query execution plans to determine which partitions of a database may need to be evaluated or searched in order to service the query). In one embodiment, request handler 232 may also perform other management functions, such as enforcing access controls or permissions, concurrency control, or recovery operations. In one embodiment, request handler 232 may implement a storage engine to access partitions, such as partitions 242a, 242b, and 242c, in storage 240 in order to process access requests (e.g., requests to read or write to items within different partitions or particular items or parts of data within a partition).

In one embodiment, request handler 232 may provide to access storage, such as storage 240a, 240b, and 240c, accessible to individual nodes of clusters 230. For example storage 240a may be one or more memory devices that are implemented as part of a host system for one node of cluster 230a, and may only be accessible to that node. While in some embodiments, storage 240 may be memory devices (e.g., RAM memory devices) in other embodiments, block-based, persistent storage devices (e.g., solid state drives or hard disk drives) may be implemented as storage for partitions 242.

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. For example, a node that is member of one cluster 230a for hosting user A's database, may also store a partition of another database for user B, as part of a different cluster, e.g., cluster 230c, in one embodiment.

In addition to dividing or otherwise distributing data sets across nodes in clusters 230 in separate partitions, nodes may also be used to implement or maintain resources in multiple different arrangements, some of which may be part of larger collections or groups of resources. A replica group, for example, may be composed of a number of nodes maintaining a replica of a partition for the database service 210. Moreover, different replica groups may utilize overlapping nodes, where a processing node may be a member of multiple replica groups, maintaining replicas for each of those groups whose other processing node members differ from the other replica groups. Thus if, for example replica group 1 has processing nodes A, B, and C, replica group 2 may have processing nodes B, D, and E. Besides differing groups of processing nodes, in various embodiments, processing nodes may have different relationships to other processing nodes. Continuing with the above example, for replica group 1, storage node A may be a master node, performing special functions with regard to access requests directed toward the partition maintained by replica group 1. For replica group 2, however, processing node B may be the master node. Therefore, a processing node's relationship to other processing nodes may be different depending on the particular grouping evaluated. These various examples of different arrangements of resources among processing nodes highlight the various different ways that control plane operations may interact with resources that are not solely devoted to one particular (though they may be) function, data replica, etc.

In at least some embodiments, the systems underlying the database service 210 described herein may store data on behalf of storage service clients (e.g., client applications, users, and/or subscribers) in tables containing items that have one or more attributes. In some embodiments, database service 210 may present clients/users with a data model in which each table maintained on behalf of a client/user contains one or more items, and each item includes a collection of attributes. The attributes of an item may be a collection of name-value pairs (sometimes referred to as key-value pairs, where the name is the name of the key and the value is the value of the key), in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, pre-defined database schemes may be employed, such as the various types of relational databases implemented using Server Query Language (SQL).

Database service 210 may provide an application programming interface (API) for requesting various operations, including operations increasing the number of nodes in a cluster or reducing the number of nodes in a cluster, or operations targeting tables, indexes, items, and/or attributes maintained on behalf of storage service clients. In some embodiments, the service (and/or the underlying system)

may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate processing nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 3:
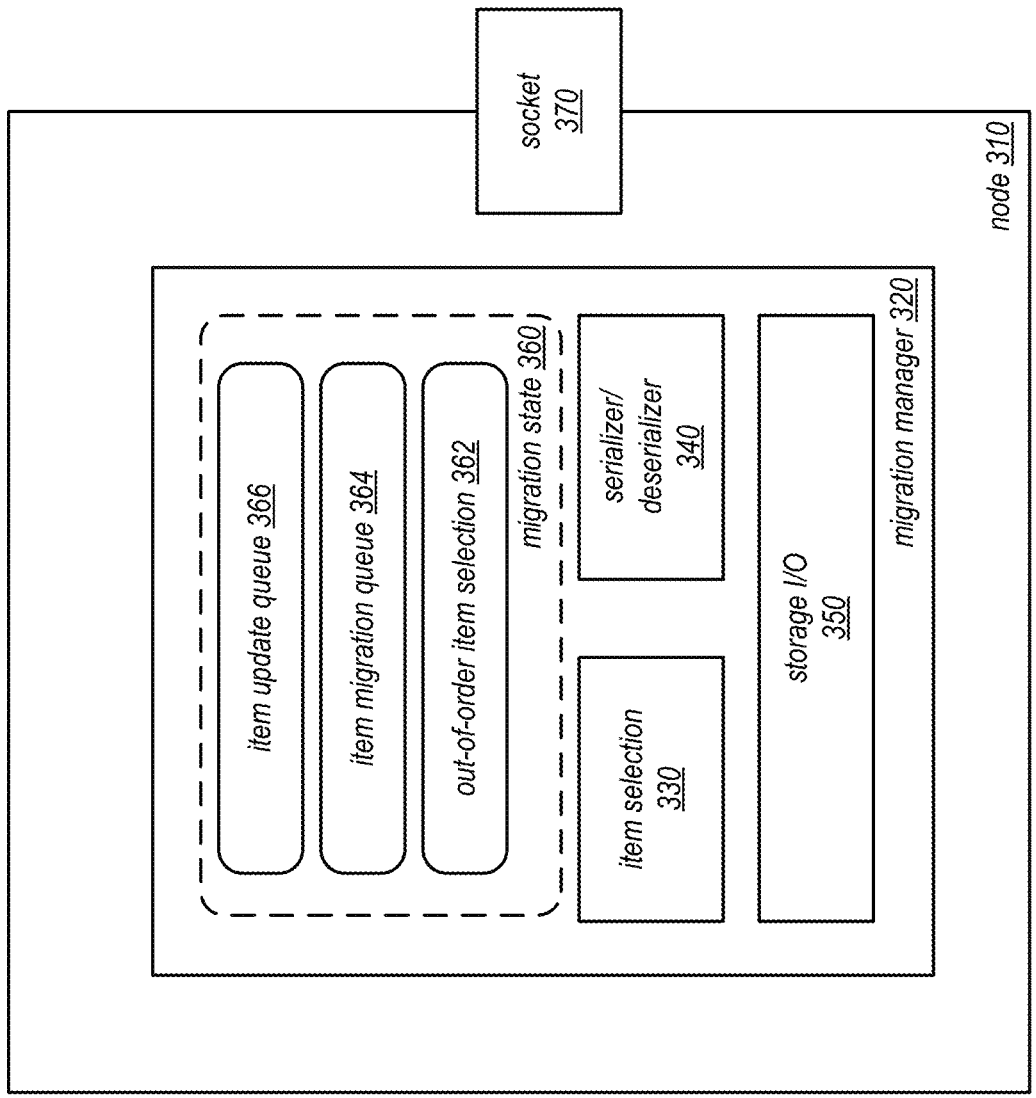
FIG. 3 is a logical block diagram illustrating a node implemented as part of a database service that can provide access to a partition of data while migrating the partition of data, according to some embodiments.

FIG. 3 is a logical block diagram illustrating a node implemented as part of a database service that can provide access to a partition of data while migrating the partition of data, according to some embodiments. Node 310 may be implemented as part of a cluster of nodes that storage and/or provide access to data of a database in storage, as discussed above with regard to FIG. 2. Node 310 may implement migration manager 320 to perform migration operations for identified partitions. For example, migration manager 320 may receive a migration request for a hosted partition, and initiate item selection 330 for the partition, and place and identifier (e.g., a pointer, address, etc.) for the item in item migration queue 364 for migration.

Item selection 330 may implement different selection techniques to determine which items (and the order thereof) to migrate in the partition, in some embodiments. For example, item selection 330 may iterate over a partition key space for the partition to identify one or more items in the partition to migrate, in one embodiment. The position or progress of the iterator within the key space may be maintained as part of migration state 360 (not illustrated), in some embodiments so that upon another iteration of item selection 330, additional keys to select may be identified. For some operations, out-of-order-selected-item information 362 may be maintained as part of migration state 360 to track keys migrated outside of the normal selection order. For example, when an access request to add an item or delete an item is processed, that item may be immediately selected 364 or the update, such as a deletion, added to the item migration queue or update item queue 366, and out-of-order selected item information 362 may be updated to include that item. In this way, when an iteration-based selection 330 of items is implemented, the item may not be re-sent to the target node, in some embodiments.

In some embodiments, migration manager 320 may implement storage I/O 350 and serializer/deserializer 340 to read or write items to storage for the node and serialize and deserialize the items received via a socket, such as socket 370, for a network communication link. For example, storage I/O may obtain a next item to send from item migration queue 364, and provide the item to serializer/deserializer 340 to write the serialized item directly to socket 370. In some embodiments, storage I/O 350 may receive the deserialized item received via socket 370 from serializer/deserializer 340 and write the item into item migration queue (for eventual writing to storage), in some embodiments. In some embodiments, these tasks may be performed by a same thread that is separate from item selection 330 and/or request handling for the node, such as request handler 232 in FIG. 2. In this way, request handling may not slow down the performance of migration, and vice versa. Storage I/O 350 may also apply the updates received for items (at target nodes), in some embodiments.

In at least some embodiments, serializer/deserializer 340 may write or receive serialized data directly from socket 370, which may eliminate the need for a client output buffer. In this way, output buffer overrun failures, errors, slowdowns or other performance issues caused by implementing a client output buffer may be eliminated (e.g., in scenarios where serialized large items do not fit within the client output buffer). Such an implementation may also, in some embodiments, eliminate the possibility of running out of allocated memory for performing a migration on a source node because the source node may not need a large buffer to store a completely serialized item. In some embodiments, serializer/deserializer 340 may write the data (or receive the data) of an item in binary format and may include the item size as part of the format. In this way, a target node can determine the size of an item before performing a deserialization (e.g., delaying or blocking items in scenarios where there is insufficient memory to deserialize the item when it is received), in one embodiment.

Figure 7:
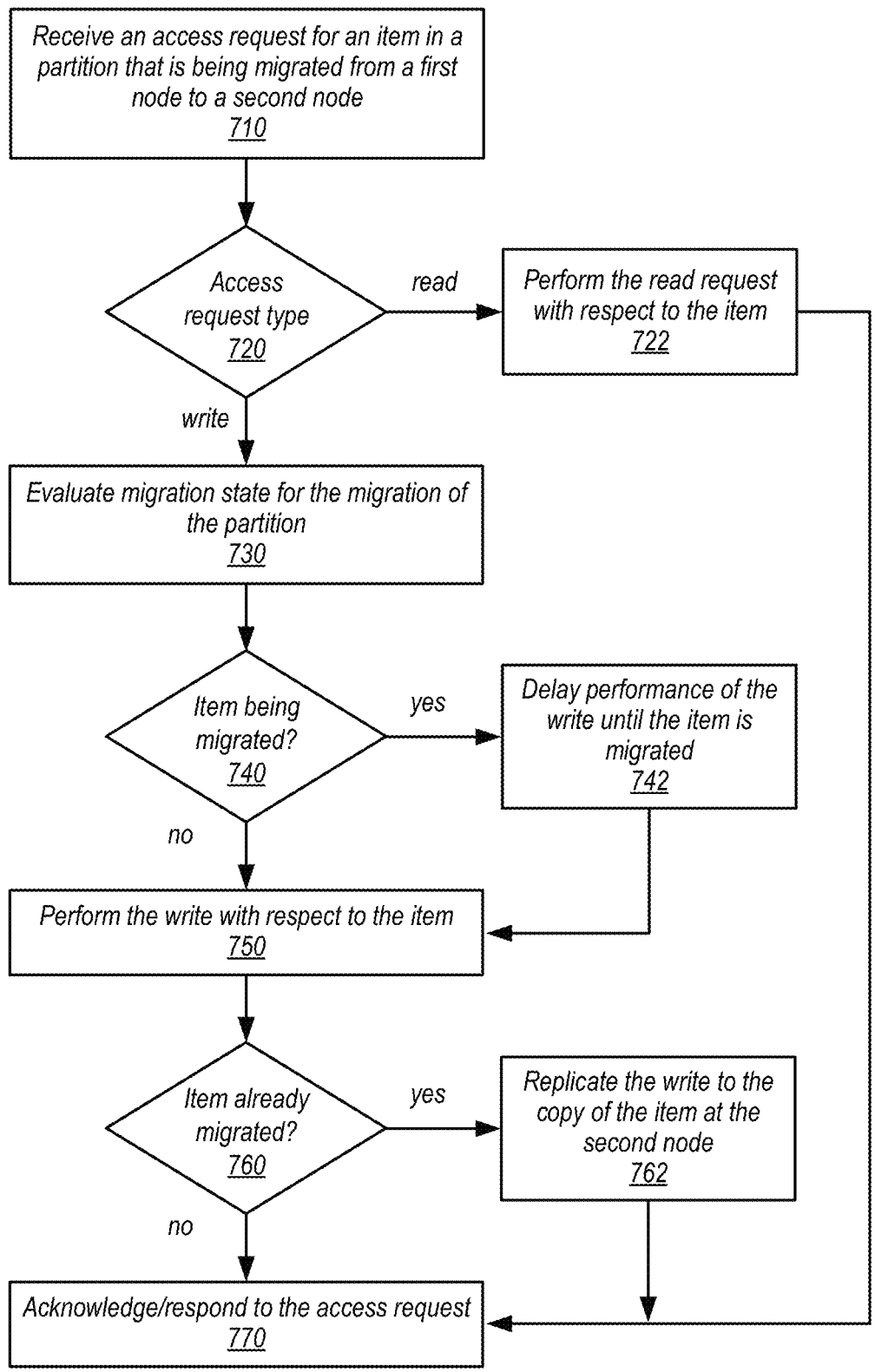
FIG. 7 is a high-level flowchart illustrating various methods and techniques to process access requests received for data in a partition that is being migrated, according to some embodiments.

As discussed below with regard to FIG. 7, in some embodiments, updates to items may be received and replicated to a target node that has already received the item from a source node. Item update queue 366 may be implemented as part of migration state 360 to store received updates (that should be transmitted to a target node or are received from a source node), in some embodiments.

Figure 4:
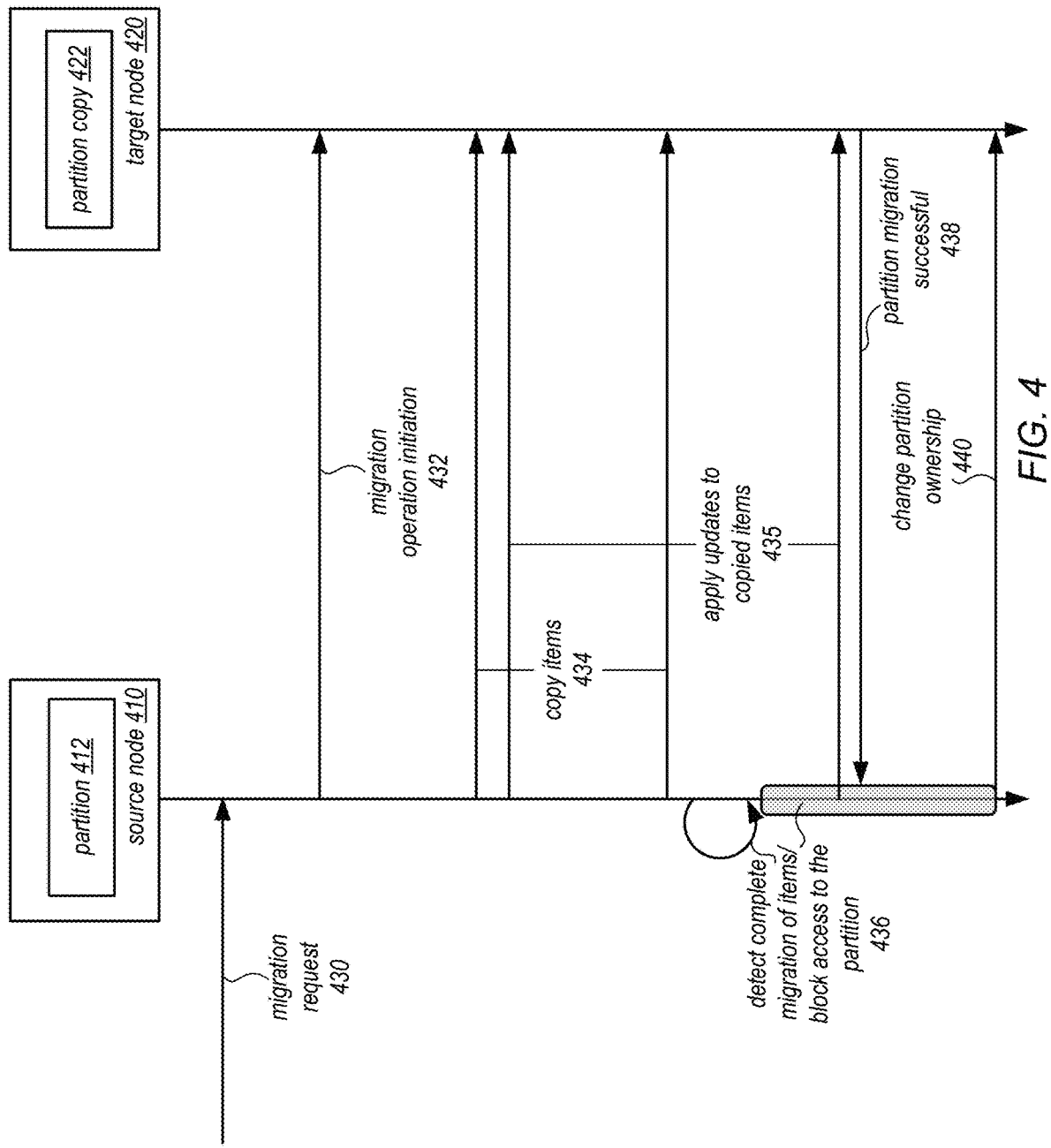
FIG. 4 is a sequence diagram illustrating interactions between a source node and a target node to perform a migration of a partition of a database while providing access to data within the partition, according to some embodiments.

FIG. 4 is a sequence diagram illustrating interactions between a source node and a target node to perform a migration of a partition of a database while providing access to data within the partition, according to some embodiments. A source node 410 that hosts a partition 412 in storage accessible to source node 410 (e.g., similar to nodes 230 and 310 in FIGS. 2 and 3 above may receive a migration request 430 migrate a partition of a database, in some embodiments. For example, the migration request 430 may identify the partition of the database to migrate (e.g., in scenarios where source node 410 hosts multiple partitions in addition to partition 412). Migration request 430 may also include the identity, location, or other information for communicating with a target node to receive the partition, such as target node 420. Source node 410 may send a request, message or other indication to target node 420 to initiate a migration operation 432 between source node 410 and target node 420 to store a copy of partition 412, partition copy 422. For example, migration operation initiation 432 may trigger the creation of a deserializer task, item queue, and update queue for performing the migration operation at target node 420.

Source node 410 may begin sending a copy of items and updates to be applied copied items 434 to target node 420, in some embodiments. For example, target node 420 may select items according to the selection techniques discussed above with regard to FIG. 3, serialize the items and send the items to target node 420. Similarly, updates 420 to items already copied to partition copy 422 may be sent 434. Once source node 410 detects completion of the migration (or transmission) of all of the items in the partition, source node 410 may block access to the partition at source node 410. For example, in some embodiments, source node 410 may deny or reject all access requests. In some embodiments, source node may hold denials or rejections until receiving the acknowledgement that the partition migration successfully completed 438 and target node 420 and then responding with denials or rejections that identify target node 420 as the owner of the partition that can process access requests to the partition.

Target node 420 may add copies of items to partition copy 422 and perform updates that are received from source node 410. Once all items have been copied and updates applied (e.g., as may be queued upon arrival at target node 420), then target node 420 may send an indication or notification to source node 410 that partition migration was successful 438. In response to the receipt of the successful migration notification 438, source node 410 may then send a notification 440 to target node 420 that ownership, and thus processing responsibility, for the partition belongs to target node 420. Source node 410 may performing background operations to delete, remove, and/or otherwise reclaim the storage space of partition 412 (e.g., in order to store other partitions), in some embodiments.

Figure 5:
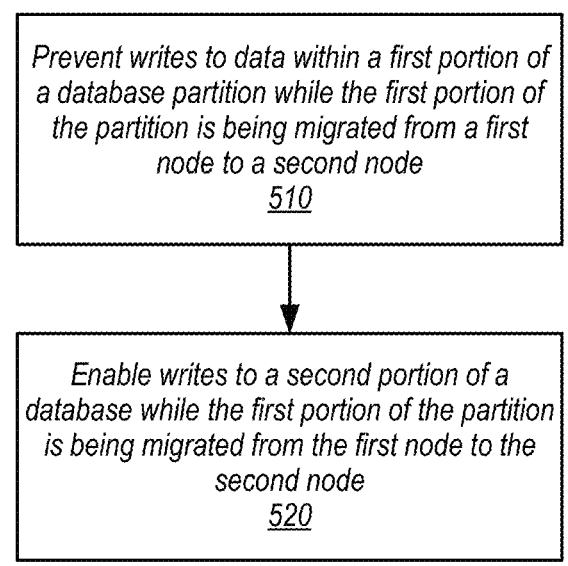
FIG. 5 is a high-level flowchart illustrating various methods and techniques to implement providing access to data within a migrating partition of data, according to some embodiments.

The examples of providing access to data within a migrating partition of data as discussed in FIGS. 2-4 above have been given in regard to a database service (e.g., a non-relational or NoSQL database service or a relational database service). However, various other types of data access, management, or control systems or data processing systems may provide access to data within a migrating partition of data, in other embodiments. FIG. 5 is a high-level flowchart illustrating various methods and techniques to implement providing access to data within a migrating partition of data, according to some embodiments. These techniques, as well as the techniques discussed with regard to FIGS. 6-8, may be implemented using components or systems as described above with regard to FIGS. 2-4, as well as other types of databases, storage engines, systems, or clients and thus the following discussion is not intended to be limiting as to the other types of systems that may implement the described techniques.

As indicated at 510, writes to data within a first portion of a database partition may be prevented while the first portion of the database is being migrated from a first node to a second node, in various embodiments. For example, a lock, or other consistency mechanism that blocks write access to data may be obtained for or enforced upon the first portion of the database partition upon start of migration of the portion. For example, the first portion of the database partition may be one or more items in the database (e.g., records, entries, rows, or other data objects) which may be selected for migration, in some embodiments. The selected items may be selected according to their logical location or identifier within the database (e.g., by a selecting individual items in the partition according to their data values, such as key values) and not with respect to their physical location (e.g., by selecting items in a given data page or block within a storage device). In some embodiments, the database may be an in-memory database that allows for the retrieval of individual items from memory smaller than the minimum retrieval or read size of a persistent, block-based storage device (e.g., a data block in an SSD or HDD). In this way, items can be logically copied from the first node to the second node irrespective of the physical location of the items within storage (e.g., the memory device(s) storing the partition of the database). In at least some embodiments, as discussed below with regard to FIG. 7, prevention of writes may include delaying the performance of the write until after the portion of the database has been migrated to the second node.

As indicated at 520, writes to a second portion of a database may be enabled while the first portion of the partition is being migrated from the first node to the second node, in some embodiments. For example, writes may be accepted at the first node during the migration of the partition of the database. As discussed below with regard to FIG. 7, when a write is received it may be determined whether or not the write is directed to an item or other part of the first portion being migrated. For those writes that are not determined to be directed to the portion being migrated (e.g., based on the locks, queues, or other migration state information that is maintained for the migration of the partition), then writes may proceed as requested (e.g., adding, modifying, or deleting item(s) within the partition), in some embodiments. In at least some embodiments, read requests directed to directed to any portion of the partition being migrated may be accepted and performed (including portions being migrated).

Figure 6:
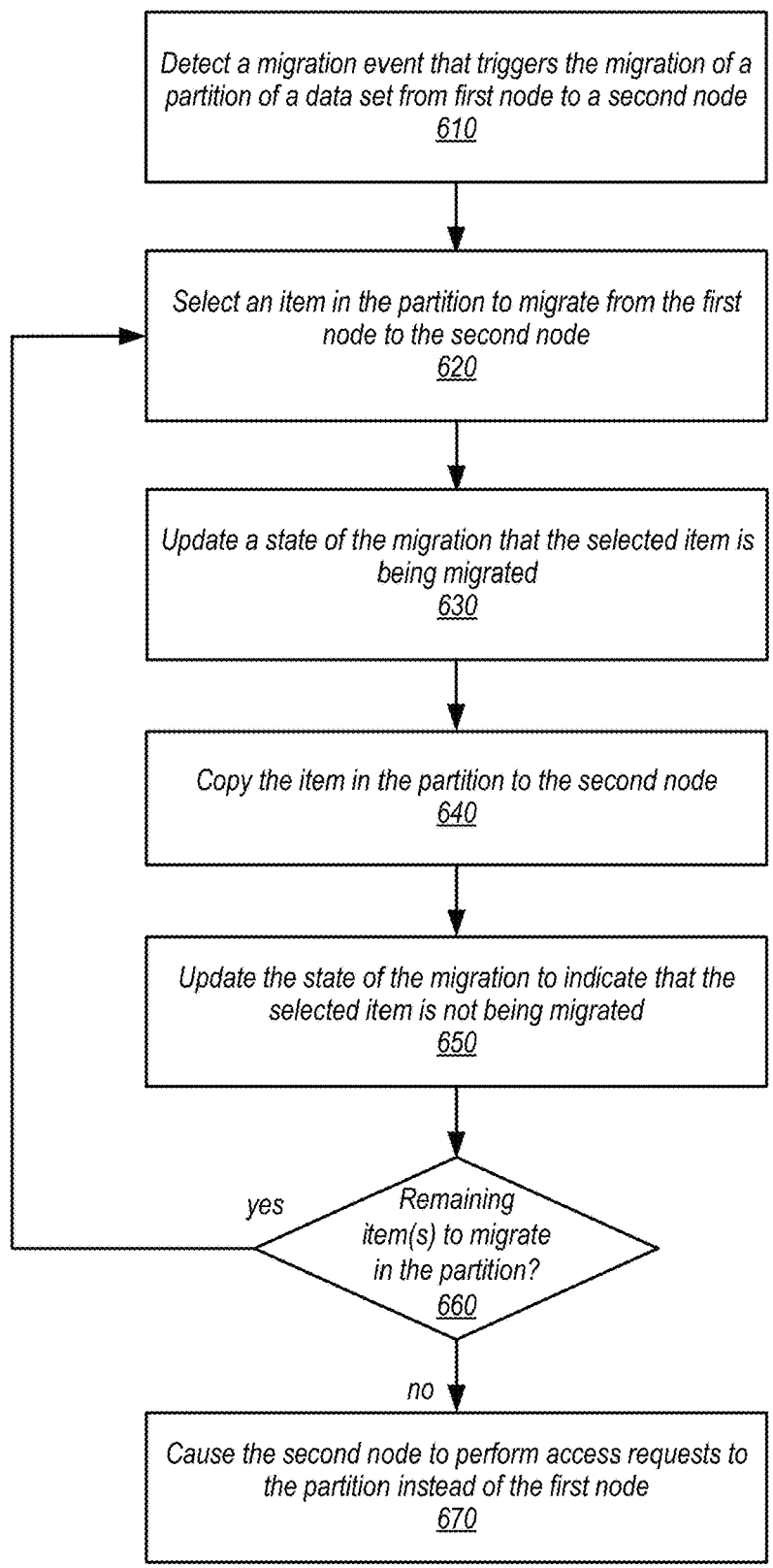
FIG. 6 is a high-level flowchart illustrating various methods and techniques to detect and perform migrations for a partition of data that provide access to data within the migrating partition, according to some embodiments.

Migration operations may be performed in different scenarios. For example, migration operations may be performed as part of increasing or decreasing the number of nodes in a processing cluster by migrating partitions to spread out partitions (in the scale up scenario for a cluster) or by migrating partitions to group more partitions at one node (in the scale down scenario for a cluster), in one embodiment. FIG. 6 is a high-level flowchart illustrating various methods and techniques to detect and perform migrations for a partition of data that provide access to data within the migrating partition, according to some embodiments.

As indicated at 610, a migration event that triggers the migration of a partition from a first node to a second node may be detected, in some embodiments. A migration event may be triggered by a user or other manual request (e.g., submitted via an API to a control plane for the nodes hosting), in one embodiment. The request may specify a scale operation for a cluster of nodes (e.g., to increase or decrease the number of nodes). In some embodiments, the request may specify which partition to move to which node, while in other embodiments, the partition to move may be automatically selected by a control or other migration management component. For example, partition load (e.g., number of access requests to a partition) may be considered so as to balance the workload for access requests amongst nodes. In some embodiments, migration events may be triggered as part of automated scaling techniques or workload balancing techniques that may migrate partitions in order to increase the capacity of a cluster to process requests (or store data), or to safeguard or increase access request processing performance by balancing the workload automatically amongst nodes in cluster. Failover or other performance-related events, conditions, or scenarios may trigger migration of a partition, in some embodiments. For example, a node that fails to process access requests within a guaranteed time frame (e.g., according to a service level agreement (SLA)), may be identified and replaced, so that the partition(s) on the failing node are migrated to the replacement node.

As indicated at 620, an item in the partition to migrate form the first node to the second node may be selected, in some embodiments. For example, a cursor technique, may scan through the items in the partition to incrementally select each item for migration, in some embodiments. Other selection techniques may select items based on size, time since last update, or other characteristics of the items in the partition that may be collected and updated. In at least some embodiments, multiple items may be selected for migration (e.g., according to a range of item values, such as partition key values). Selection of items may be throttled, delayed, or otherwise slowed (e.g., selecting one item instead of two items), in some embodiments. For example, resource utilization at the first node may be monitored (e.g., processor, memory, network bandwidth, I/O, etc.) and compared with throttling thresholds or values (inclusive of the resources utilized by other operations at the first node, such as processing access requests). If the resource utilization exceeds the throttling thresholds, then throttling may be applied to slow or delay the selection of items for migration in the partition, in some embodiments. In some embodiments, the number of items that may be selected for migration (e.g., in an item migration queue) may be limited.

For a selected item, state of the migration may be updated to indicate that the item is being migrated, as indicated at 630. A lock table, queue, or other set of information that may be included in the state of the migration may track the identifiers of or pointers to items that are being migrated (e.g., without storing the entire item), in order to identify which items are being migrated, in some embodiments. As indicated at 640, the item in the partition may be copied to the second node. For example, as discussed above with regard to FIG. 3, the item may be serialized and written directly to the socket for the network communication to the second node without intermediary buffering so as to reduce the memory needed to send the item. At the second node, the item may be deserialized and written to storage (e.g., memory or persistent, block-based storage, such as hard disk or solid state drives). Once successfully copied, the state of the migration may be updated to indicate that the item is not being migrated, as indicated at 650, in some embodiments. For example, the pointer or identifier for the item may be unlocked or otherwise removed from the lock table, queue or other set of information. In some embodiments, migrated items may be tracked or retained by other migration state information so that when updates to the migrated items are received, the copy at the second node may receive an indication of and replicate the updates, in some embodiments.

Item migration may be performed as part of an iterative process, in some embodiments. As indicated at 660, a check or determination as to whether other items in the partition remain to be migrated, in one embodiment. If so, as indicated by the positive exit from 660, then the additional items may be selected and copied according to the techniques discussed above. Upon complete migration of the partition, the second node may be caused to perform access requests to the partition instead of the first node, as indicated at 670. For example, access requests may no longer be accepted at the first node but instead may be rejected or redirected to the second node (e.g., by the first node or a routing layer, component, or device), in some embodiments. In at least some embodiments, delayed or accepted updates to items that have been migrated at the first node may be provided to the second node (as discussed below with regard to FIG. 7) prior to the second node beginning to accept access requests (while access requests are blocked, rejected, redirected, or denied at the first node), in some embodiments. In some embodiments, items from the partition may not be deleted from the first node until completion of the migration.

Techniques for handling access requests to data within a partition may be differ depending on the type of access request and the item(s) being requested. Techniques that implement providing access to data within a migrating partition of data can provide fine-grained access to items in the partition, which can minimize or eliminate the impact of migration upon the performance of access requests. FIG. 7 is a high-level flowchart illustrating various methods and techniques to process access requests received for data in a partition that is being migrated, according to some embodiments.

As indicated at 710, an access request for an item in a partition that is being migrated from a first node to a second node may be received, in some embodiments. Requests may scan, query, retrieve, obtain, or otherwise read an item from the partition or may change, update, modify, delete, add, or otherwise write the item in the partition, in some embodiments. Access requests may be submitted via different kinds of interfaces or protocols, such as Structured Query Language (SQL) statements that specify one or more items, including criteria for identifying the items, to satisfy the access request or Get or Put requests that may be defined or implemented according to respect APIs, in some embodiments. The access request may specify multiple items in either the partition being migrated or items in one or more other partitions of the database or other data set (which may be hosted at the source node or other nodes), in some embodiments.

As indicated at 720, the access request type may determine how the access request is handled. If the access request type is a read request, then as indicated at 722, the read request may be performed with respect to the item, in some embodiments. For example, in such embodiments, all read requests may be performed whether or not the item has been migrated or is undergoing migration. In some embodiments, updates to an item received as write access requests may be delayed, as discussed below with regard to 742. Such pending writes received before a read request also directed the same item (being replicated) may be applied or included in the read, in some embodiments.

As indicated at 730, for those access requests that are writes (e.g., changes to, modifications to, additions of or deletions of the item), migration state for the migration of the partition may be evaluated, in some embodiments. For example, a migration queue, lock table, or other information that may be included in the migration state may be evaluated to determine if the item is being migrated, in one embodiment. If the item is not being migrated, as indicated by the negative exit from 740, then the write may be performed with respect to the item, as indicated at 750. In some embodiments, writes to items that are not being migrated (but have already been migrated) may be prevented if the number of updates to be applied to the copies of migrated items (as discussed below at 762) exceeds a throttling threshold for the allowing writes to a migrating partition.

If, however, the item is being migrated, as indicated by the positive exit from 740, then, as indicated at 742, performance of the write may be delayed until the item is migrated. For example, a change log, queue, or other allocation of storage may be implemented that records the write request (or the change to be made by the write request, such as the new value of the item), that may be replayed to perform the write upon an indication that the item has been migrated, in one embodiment. In some embodiments, if the change log or queue for writing items grows too large (e.g., when compared with write throttling threshold), then writes to the item may be dropped, rejected, denied, or otherwise prevented.

In some embodiments, the updates to items (including additions and deletions) included as a result of the write request may be replicated to the second node (the target node) so that the copy of the item in the copy of the partition at the target node is consistent with the version of the item at the first node (the source node). As indicated at 762, the write may be replicated to the copy of the item at the second node, in some embodiments. For example, a write request or other description of the write to perform may be sent to the target node for the item, in some embodiments. In another example, a new value for the item may be sent to the target node, in some embodiments.

An acknowledgement or response to the access request may be sent, as indicated at 770 in some embodiments. For example, the requested data for a read request (e.g., the item along with other requested items or data) may be included and sent in response to a client that sent the access request. An acknowledgement of the write request (which may indicate that the write request is committed to the item) may be sent to client that sent the access request, in another example. In some embodiments, acknowledgments of element 770 and replication of updates of element 762 may be performed in parallel.

Figure 8:
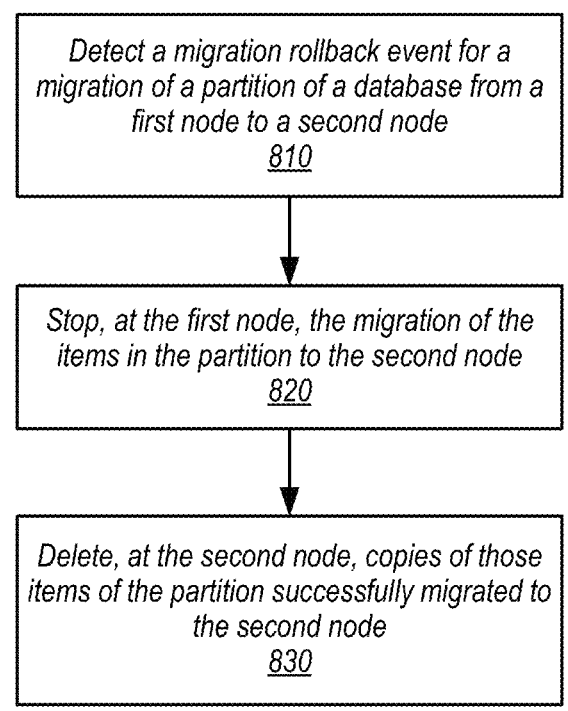
FIG. 8 is a high-level flowchart illustrating various methods and techniques to detect and rollback a migration of a partition, according to some embodiments.

Migration operations may fail or stall for numerous reasons, in some embodiments. External events, such as power failures in a data center or partitions in a network that connects a target and source node transferring data, for instance, may prevent the continuance of a migration operation. Similarly, failures or other conditions at either or both of the nodes involved in the migration of a partition may make the abortion of a migration operation desirable, in some embodiments. Techniques that implement providing access to data within a migrating partition of data can easily rollback migration of a partition, as the source node for a partition migration may still retain migrated items and apply updates received for those items, in some embodiments. In this way, rollback may avoid costly data transfers in order to revert responsibility for a partition to the source node. FIG. 8 is a high-level flowchart illustrating various methods and techniques to detect and rollback a migration of a partition, according to some embodiments.

As indicated at 810, a migration rollback event for a migration of a partition of a database from a first node to a second node, in some embodiments. Migration rollback events may be detected or otherwise triggered based on one or more criteria. For example, performance criteria for nodes involved in the migration of partition may include evaluating the processor, network, memory, I/O bandwidth, or other resource utilization with respect to a threshold value or percentage, in some embodiments. If, for instance, memory utilization at one of the nodes exceeds 80% (e.g., of total memory capacity or total capacity allocated to migration), then a migration rollback event may be triggered. In some embodiments, migration rollback events may be triggered by request processing or other load on the nodes, separate from the migration operation, such as the load caused by access requests to the nodes for the partition being migrated (or other partitions that may be hosted at the nodes). Heartbeat messages or other "liveness" indications may be exchanged between nodes in some embodiments which if not received (e.g., due to node failure or network failure) for some time may satisfy the criteria for triggering a migration rollback event. In some embodiments, a migration rollback event may be triggered in response to a user request submitted to a control plane (or directly to a node), such as via an API request to abort/rollback the migration operation.

Migration rollback events may be detected by control plane or other resources external to the nodes performing the migration operation that monitor the performance of the nodes. The control plane may then send migration rollback event indications to the nodes to specify the migration operation to rollback (e.g., by identifying the partition and/or the nodes involved in the migration operation). In some embodiments, the nodes themselves may detect migration rollback events. A message or indication may be sent indicating the migration rollback event to the other node involved in the migration operation. Migration operation events may be unilaterally detected and triggered by a node, in some embodiments. For example, if one node fails to send heartbeat messages to another node, then the other node may trigger a rollback event.

Once a migration rollback event is detected, migration of the items in the partition to the second node may be stopped at the first node, as indicated at 820, in some embodiments. For example, the selection task, thread, or other component responsible for identifying new items to be migrated may be killed, released, or otherwise halted from selecting additional items, in one embodiment. A marker, indicator, other information may be updated in migration state to identify the migration of the partition as being rolledback (which may not halt or impede the migration of the other partitions that may be occurring at the nodes, as one or both of the nodes may be sending or receiving a partition as part of a migration operation with other nodes). Operations to clean up or otherwise delete migration data or other state information may be performed (flushing, purging, or reclaiming space from the migration queue or update queue). An indication or other notification of the rollback of the operation may be sent to a client, user or other communication endpoint, in some embodiments.

As indicated at 830, copies of the items of the partition successfully migrated to the second node may be deleted at the second node, in some embodiments. For example the second node (the target node) may implement a background sweeper or scrubber that scans for items included in the partition to be deleted, marked for deletion, or otherwise reclaimed for other uses by the second node, in one embodiment. The deletion process may delete copies without impacting the processing of access requests for other partitions at the host node, in some embodiments, (e.g., by enforcing a utilization threshold above which resources may not be used to perform deletion operations).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments to implement providing access to data within a migrating partition of data as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

Figure 9:
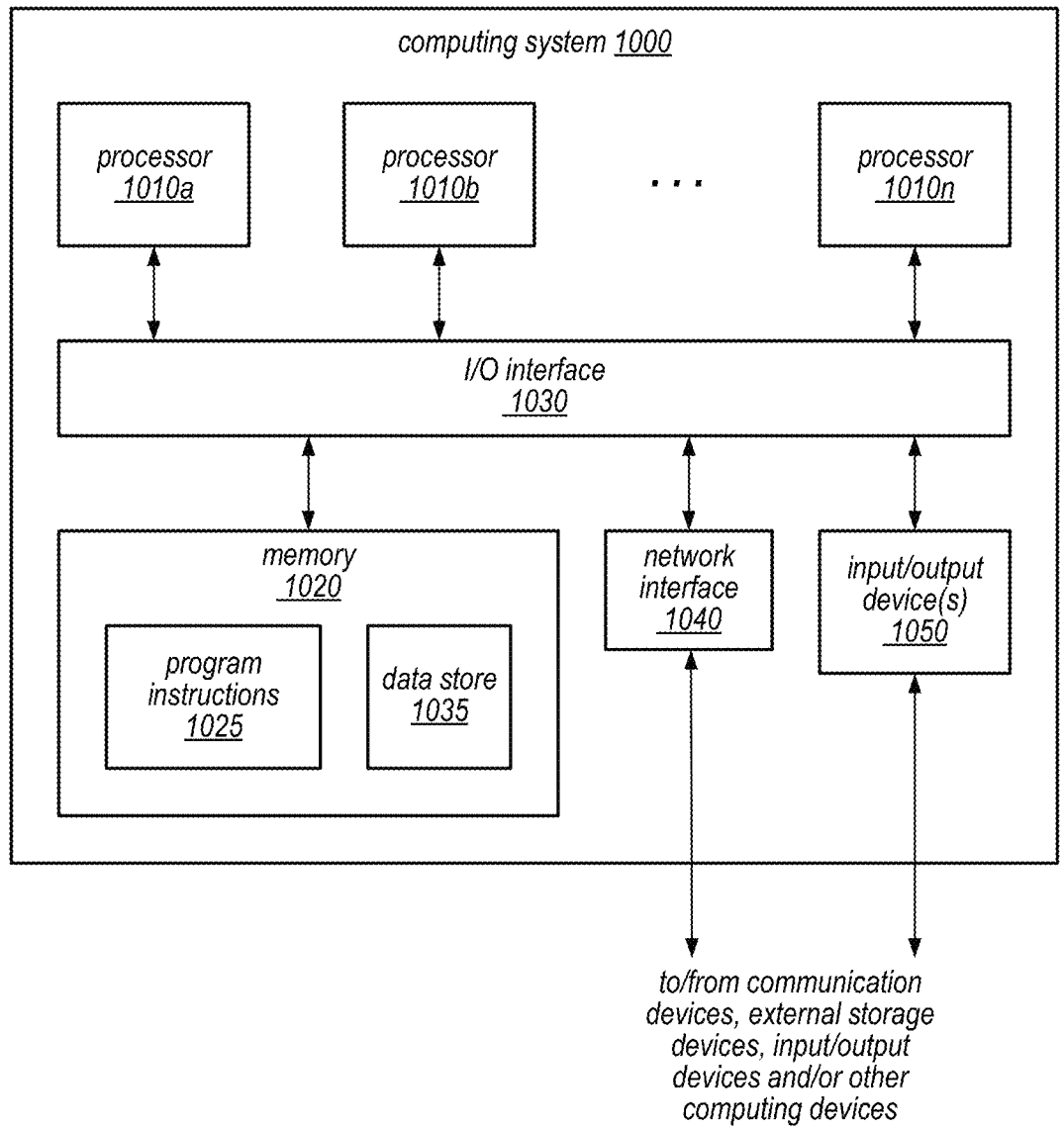
FIG. 9 is a block diagram illustrating an example computing system, according to some embodiments.

As shown in FIG. 9, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
during the migration of a database partition comprising a plurality of items from a first node to a second node:
iteratively select items within the database partition to migrate from the first node to the second node;
prevent writes to the selected items while the selected items are being migrated from the first node to the second node; and
enable writes to other items within the database partition not being migrated while the selected items are being migrated from the first node to the second node.

2. The system of claim 1,
wherein the method further causes the at least one processor to receive a write request for one of the selected items;
wherein to prevent writes to the selected items while the selected items are being migrated from the first node to the second node, the method causes the at least one processor to delay performance of the write request until the migration of the one selected items is completed at the second node; and
wherein the method further causes the at least one processor to replicate the write request to the second node with respect to the one selected item.

3. The system of claim 1, wherein the method further causes the at least one processor to:

detect a rollback event for the migration of the database partition; and in response to the detection of the rollback event for the migration of the database partition:
halt further selection of the items in the database partition at the first node for migration; and
delete, at the second node, copies of those items of the database partition successfully migrated to the second node.

4. The system of claim 1, wherein the at least one processor is implemented as part of a database service offered by a provider network, wherein the database service implements an in-memory database for storing the database partition, and wherein the migration of the database partition is triggered in response to a request received at the database service from a client of the database service.

5. A method, comprising:
preventing writes to data within a first portion of a database partition while the first portion of the partition is being migrated from a first node to a second node; and
enabling writes to a second portion of the database partition while the first portion of the partition is being migrated from the first node to the second node.

6. The method of claim 5, further comprising:
selecting one or more items of the database partition as the first portion to migrate;
updating migration state information for the migration to identify the one or more items as being migrated;
updating the migration state information to remove the one or more selected items as the one or more selected items are migrated; and
wherein preventing writes to data within the first portion of the database partition while the first portion of the partition is being migrated comprises evaluating the migration state information to determine whether a received write request is directed to an item identified in the migration state information.

7. The method of claim 6, wherein the migration state information is an item queue, and wherein the method further comprises:
identifying an item to migrate from the item queue; and
generating a serialized version of the item to send to the second node, wherein the second node generates a deserialized version of the item to stores as part of a copy of the database partition.

8. The method of claim 7, wherein the serialized version of the item is written directly to a socket at the first node for transmission to the second node.

9. The method of claim 8, wherein the serialized version includes a size indicator for the item, and wherein the method further comprises:
comparing, at the second node, the size indicator to available storage for generation of the deserialized version of the item; and
delaying the generation of the deserialized version of the item upon a determination that a size of the item exceeds the available storage for generation of the deserialized version of the item.

10. The method of claim 5, further comprising:
receiving a request to read the data within the first portion of the database partition while the first portion of the database partition is being migrated; and
performing the request to read the data within the first portion of the database partition.

11. The method of claim 5, further comprising:
prior to completing migration of the database partition:

receiving a request to write the data within the second portion of the database partition while the first portion of the database partition is being migrated, wherein the second portion of the database partition was previously migrated to the second node;
performing the write request to the data within the second portion of the database partition; and
replicating the write request to a copy of the data at the second node.

12. The method of claim 5,
detecting a rollback event for the migration of the database partition; and
in response to detecting the rollback event for the migration of the database partition:
halting further migration of other data in the database partition at the first node; and
deleting, at the second node, data of the database partition successfully migrated to the second node.

13. The method of claim 5,
wherein the method further comprises receiving a write request for the data within the first portion;
wherein preventing writes to data within the first portion of the database partition while the first portion of the partition is being migrated comprises delaying performance of the write request until the migration of the data is completed at the second node; and
wherein the method further comprises replicating the write request to the second node with respect to the one selected item.

14. A non-transitory, computer-readable storage medium, storing program instructions that when executed by one or more computing devices cause the one or more computing devices to implement:
selecting a first portion of a database partition to migrate from a first node to a second node;
preventing writes to data within the first portion of the database partition while the first portion of the partition is being migrated from the first node to the second node; and
enabling writes to a second portion of the database partition while the first portion of the partition is being migrated from the first node to the second node.

15. The non-transitory, computer-readable storage medium of claim 14,
wherein the program instructions cause the one or more computing devices to further implement receiving a write request for the data within the first portion;
wherein, in preventing writes to data within the first portion of the database partition while the first portion of the partition is being migrated, the program instructions cause the one or more computing devices to implement delaying performance of the write request until the migration of the data is completed at the second node; and
wherein the program instructions cause the one or more computing devices to further implement replicating the write request to the second node with respect to the one selected item.

16. The non-transitory, computer-readable storage medium of claim 14, wherein the program instructions cause the one or more computing devices to further implement:
updating migration state information for the migration to identify the one or more items as being migrated;
updating the migration state information to remove the one or more selected items as the one or more selected items are migrated; and wherein, in preventing writes to data within the first portion of the database partition while the first portion of the partition is being migrated, the program instructions cause the one or more computing devices to implement evaluating the migration state information to determine whether a received write request is directed to an item identified in the migration state information.

17. The non-transitory, computer-readable storage medium of claim 14, wherein the program instructions cause the one or more computing devices to further implement performing the selecting, the preventing, and the enabling as part of a migration operation triggered in response to the detection of a migration event for the database partition.

18. The non-transitory, computer-readable storage medium of claim 14, wherein the program instructions cause the one or more computing devices to further implement:
   prior to selecting the first portion of the database partition for migration, determining that throttling threshold for performing the migration of the database partition is not exceeded.

19. The non-transitory, computer-readable storage medium of claim 14, wherein the program instructions cause the one or more computing devices to further implement:
   prior to completing migration of the database partition:
      receiving a request to write the data within the second portion of the database partition while the first portion of the database partition is being migrated, wherein the second portion of the database partition was previously migrated to the second node;
      evaluating a throttling threshold for performing writes to migrated data; and
      based on the evaluation of the throttling threshold, preventing performance of the request to write to the data within the second portion of the database partition.

20. The non-transitory, computer-readable storage medium of claim 14, wherein the program instructions cause the one or more computing devices to further implement:
   detecting a rollback event for the migration of the database partition; and
   in response to detecting the rollback event for the migration of the database partition:
      halting further selection of data in the database partition at the first node for migration; and
      deleting, at the second node, data of the database partition successfully migrated to the second node.

* * * * *